Patented May 7, 1935

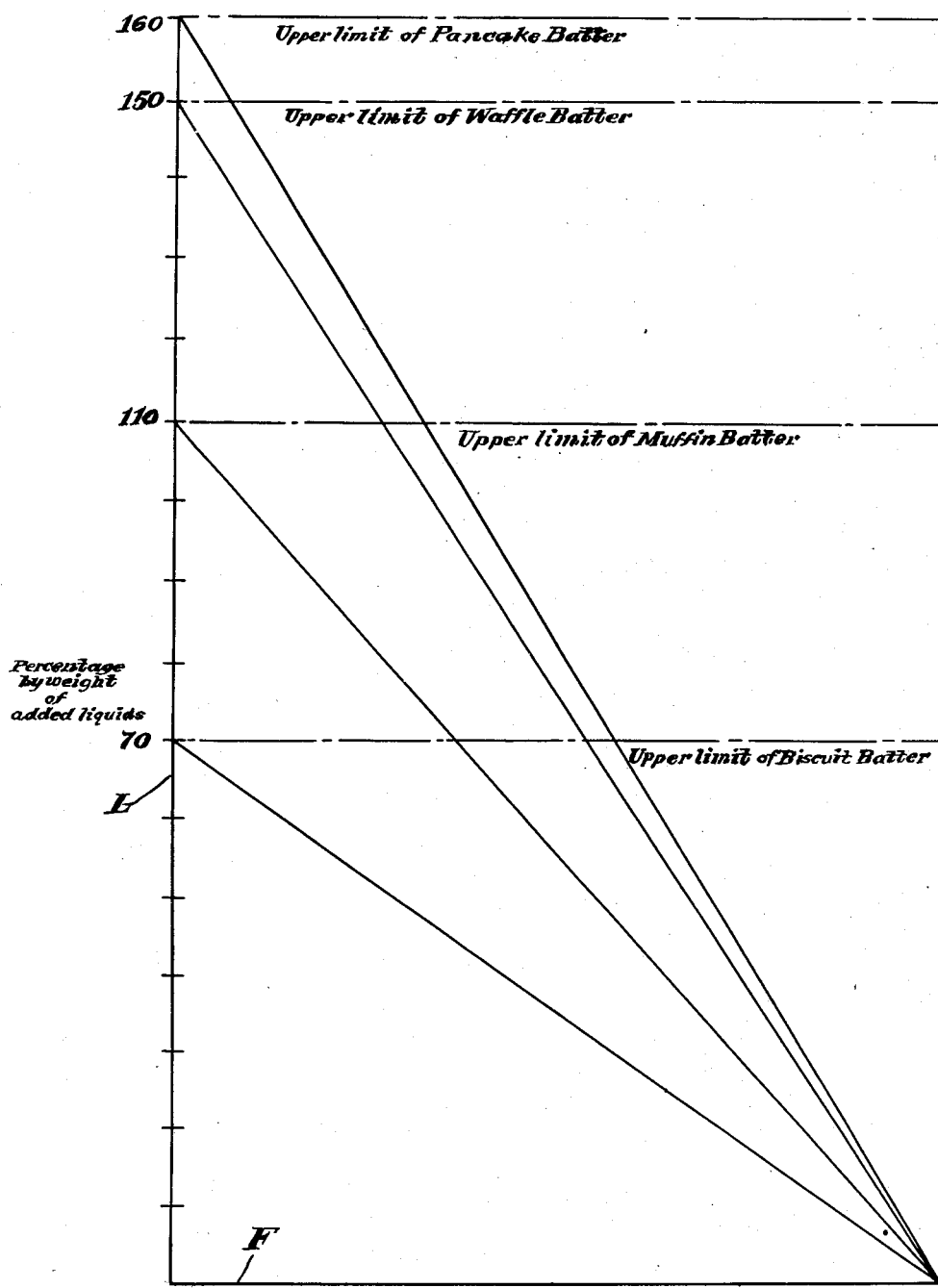

2,000,888

UNITED STATES PATENT OFFICE 2,000,888

MULTIUSE BATTER PRODUCT

Augustus H. Fiske, Warren, Bevan W. Colby, Providence, and Georgia B. Lewis, Rumford, R. I., assignors to Rumford Chemical Works, Rumford, R. I., a corporation of Rhode Island Application January 18, 1934, Serial No. 707,136

2 Claims. (Cl. 99—10)

This invention relates to the problem of a multi-use dry batter product. Its aim is to provide a ready prepared balanced product which will upon mixing with a predetermined fluid content provide for such widely differentiated, but very particularly identified articles as biscuits, muffins, waffles or griddle cakes.

The epicurean exactions in this art make it difficult for the most careful of cooks to attain constant success. In the commercial production of prepared mixtures for quick and satisfactory results, the problem of a multi-use batter product is a serious challenge. The differences between tea biscuits and muffins or waffles is one of fineness and the cook is dependent upon that efficiency of material which is the test of the products used.

Our concept was that of a multi-use dry product, commercially possible and economically available, from which by a simple variation of fluid admixture different distinctive and delectible edible articles, true to type, might be produced. Such articles are by the very nature of their individualities most desired in dietetics. The problem of the producer of commercial products for the kitchen has been to make that individuality potential in as wide a range as possible.

Our studies of leavened products has turned us to a group well known individually but never before satisfied by an available single product. We refer particularly to the range from biscuit or, what might be called in the diet a bread, to waffles or like articles which are more luxuriously considered as delicacies.

Our answer lies in the concept that in this range there is a potential balance of ingredients. By the supply of certain essential ingredients in proper proportion or ration the essential requirements are satisfied.

Some supposedly dominant elements are not really necessary. The requirement is one of balance and thereby potential technique. Such a suggestion to those who have struggled with the art in factory or kitchen needs no emphasis.

To come directly to our solution of the problem, we will describe a product which is so characteristic of the answer that it in fact may not be widely varied or the balance will be lost.

To produce a commercial product capable of consistent source, reliability and adaptability to variant cooking technique, we have established a somewhat definite basis of operation.

In this we avoid several difficulties that have been current in the art. One supposed problem was that of isolating the leavening reactants. That was a false premise. Another was that of the common expedient of varying the product by changing its concomitants. Such suggested changes are not consistent with well regulated factory production. To serve the varied requirements of the kitchen and cook, the products must be as scientifically compounded and tested as is possible. We have done this. Our concept is that of efficiency and economy. It varies only from general kitchen practice in that it is consistent for the variety of articles or products made possible.

Taking the range of usual raised kitchen products, we have satisfied what seems commercially the challenge of the desideratum. We have carefully analyzed the many recipes for all of this scope of products. There are many and varied ingredients specified, but we find that many of these products have been too individually conspicuous in their own peculiar characteristics. By going back of the individual character of any one of the articles used in these final products, we have reached a basis of common factors. If these be provided in forms selected as to necessary character and to the exclusion of unnecessary individualities, there may be attained that multi-usefulness or scope in one single product.

As to this we emphasize our concept that it is now possible to do this by a single factory standard mixture by only the simple variant of the liquid content scientifically proportioned. In other words, the mistakes of the past were due to wrong emphasis on highly individual ingredients that so dominated as to preclude a biscuit from a waffle mix or vice versa.

Our concept teaches that blending and balancing the essential material food factors we attain a potentiality only dependent on the physical fluidity or possibly of the leavening response of the batter or dough for the balance of the mix.

Without attempting further to discuss the intricacies underlying the principles of balance, we will attempt to illustrate by concrete examples of practical formulae that effectiveness of product which our invention provides.

A characteristic factory product according to our invention may comprise the following:—

| | Percent |
|---|---|
| Soft wheat flour | 82.36 |
| Whole egg powder | 0.82 |
| Powdered whole milk | 3.29 |
| Granulated sugar | 2.47 |
| Monocalcium phosphate | 1.64 |
| Acid sodium pyrophosphate | 0.82 |
| Bicarbonate of soda | 1.81 |
| Salt | 1.85 |
| Shortening | 4.94 |
| | 100.00 |

This is carefully balanced, as will be detected by those having practice and experience in the art. The simple compounding of this we set forth as follows in which we give desirable and effective detail but which procedure may be somewhat varied.

In preparing the product we weigh the flour into the mixer and start the mixer. We then sift into the mixer the sugar, salt, phosphates and bicarbonate of soda in the order noted. The dried powdered whole milk and the dried powdered whole egg is then added and the whole mixed for a period of ten minutes. We then add the shortening in one end of the mixer and continue running the mixer for fifteen minutes. At the end of this time, or approximately this time, the mixture is ready for the filling machine, labelling and packing.

The shortening is incorporated as above described in a regular commercial spade mixer which is particularly efficient for smearing or spading the shortening into the entire mass of the mixture.

Such a product when mixed with predetermined percentages of liquid make the desired articles as specified. Like the proportions of the formula, the amounts of fluid content are carefully predetermined in their relation to the ingredients of the product and to the type of the batter for the article to be cooked. This not only relates to the matter of fluidity of the batter but is important in the development of the inter-relation of the materials to the mixture. This is particularly true where the liquid added is milk which not only adds to the fluidity but raises the fat content. For the purpose of making more clear we have shown in the accompanying drawing a simple graph. This will assist in understanding the inter-relation of the batters of the different cooked articles and the percentages of added fluid. The fluid may be expressed for domestic proportions in the ratio of composition as follows:

Biscuits—2 cups prepared flour to scant ¾ cup of liquid.
Muffins—2 cups prepared flour to 1⅛ cups of liquid.
Waffles—2 cups prepared flour to 1½ cups of liquid.
Pancakes—2 cups prepared flour to 1⅔ cups of liquid.

For the more scientific exact expression and one better adapted to factory formulations, the percentages may be expressed as follows:

Biscuits— 2 cups prepared flour (250 grams) and scant ¾ cup liquid, approximately (170 grams) or about 70%.
Muffins— 2 cups prepared flour (250 grams) and 1⅛ cups liquid, approximately (275 grams) or about 110%.
Waffles— 2 cups prepared flour (250 grams) and 1½ cups liquid, approximately (365 grams) or about 150%.
Pancakes—2 cups prepared flour (250 grams) and 1⅔ cups liquid, approximately (405 grams) or about 160%.

This we have graphically indicated in the accompanying graph. In this the base line F indicates any arbitrary unit by weight of our product in accordance with our invention, and the vertical line L represents the amount of liquid in percentage to be added to produce the characteristic batters as above described.

From the foregoing it will be seen that we have produced a remarkable product whether viewed domestically or from the manufacturing standpoint. Such a product having a normal balance in its basic or dry factor is capable of variant batter development by the simple addition of a fluid element according to the definite basis of dispersion required to produce the particular individual characteristic in the ultimate product of cookery.

The matter of dispersion has been neglected in this art. Much of our food products tend materially to colloidal dispersion even if this has not been recognized.

While in our present project this may seem to be somewhat of a matter of degree, nevertheless in the actual thermal process of conversion to the cooked article, the material state or colloidal degree of dispersion is found to be most practically important.

Our concept is that by producing a normal, balanced batter basis we can so provide for variety that the resultant batters are absolutely characteristic. We call particular attention to the peculiar dispersion effect of the fluid constituent of the batter. There is no assignable relation between the apparent obviously but not controlling matter of fluidity and the matter of batter development or internal evolution.

It is, of course, physically important to have flow to pan or iron, but there is, as we have shown a matter of material development in the admixture of a fluid with a dry prepared balanced flour product such as we have described. The relation of soluble and dispersible elements must be carefully based on the ultimate batters to be produced and the potential result. A batter must be conceived of as a state of matter potentially convertible by heat and perhaps somewhat by formation into standard articles of distinct identification in diet. Each race has developed its basic food forms which are important to its sustenance. Our invention contemplates this practical and really important end.

While the ingredients and proportions specified provide an unusually perfect product, certain equivalents might be substituted and the indicated balance maintained.

What we therefore claim and desire to secure by Letters Patent is:—

1. A dry multi-use batter product for the range of products including biscuits, muffins, waffles and pancakes, comprising a soft wheat cereal base approximately 82.36%, adequate free leavening reactants about 4.27% dispersed therein, whole egg product approximately .82% including yolks and whites, powdered whole milk 3.29%, granulated sugar 2.47%, salt 1.85% and a shortening of hydrogenated oil character 4.94%, the addition of indicated gradation of liquid yielding characteristic batters from which the said articles can be cooked.

2. A dry multi-use batter product for the range of products including biscuits, muffins, waffles and pancakes, comprising a soft wheat cereal base approximately 82.36%, adequate free leavening reactants about 4.27% dispersed therein, whole egg product approximately .82% including yolks and whites, powdered whole milk 3.29%, granulated sugar 2.47%, salt 1.85% and a shortening of hydrogenated oil character 4.94%, said product rendering a biscuit batter by the addition of 70% by weight of a liquid, a muffin batter by the addition of 110% by weight of liquid, a waffle batter by the addition of 150% by weight of liquid, and a pancake batter by liquid addition of 160% by weight.

AUGUSTUS H. FISKE.
BEVAN W. COLBY.
GEORGIA B. LEWIS.